May 21, 1929.  H. B. STAVER  1,714,328
RACING TRACK APPARATUS
Filed Jan. 13, 1927
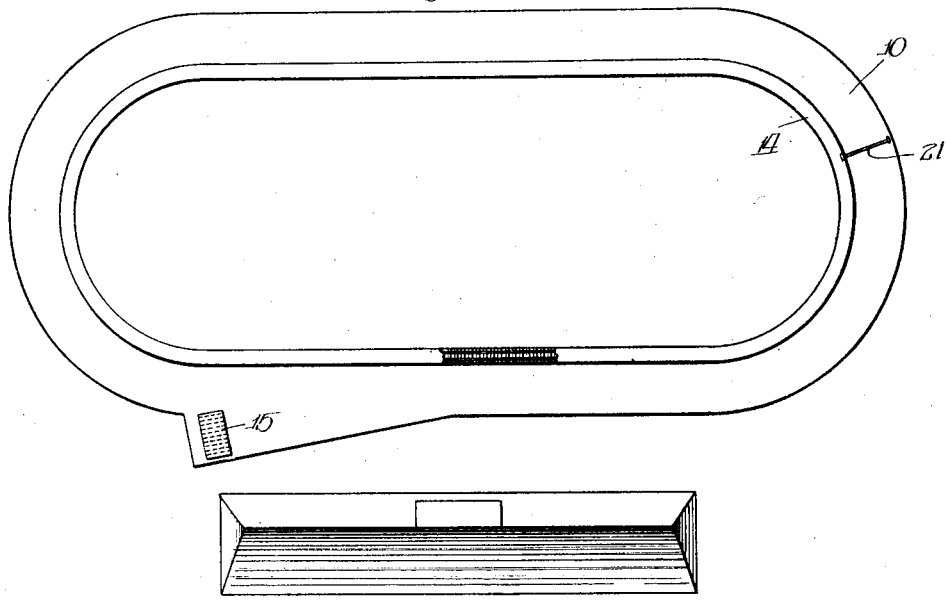
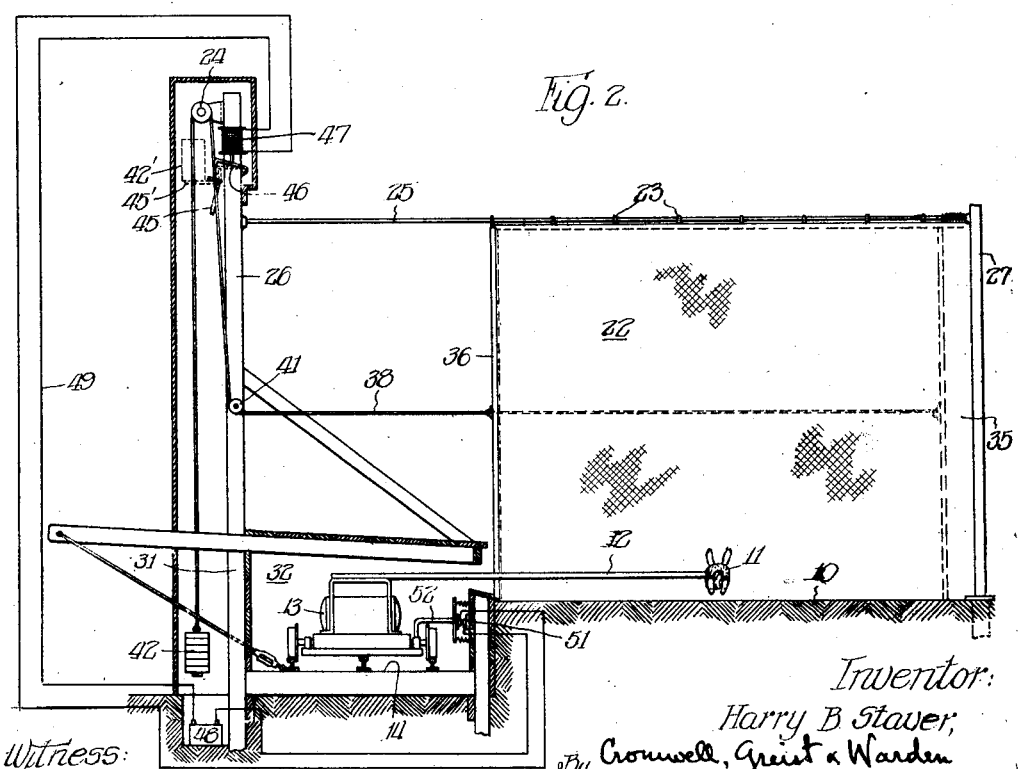
Witness:
R. Burkhardt
Inventor:
Harry B. Staver,
By Cromwell, Greist & Warden
attys Patented May 21, 1929.

1,714,328

UNITED STATES PATENT OFFICE.

HARRY B. STAVER, OF CHICAGO, ILLINOIS.

RACING-TRACK APPARATUS.

Application filed December 13, 1927. Serial No. 160,806.

This invention relates to racing track apparatus and it has particular relation to means and methods for operating racing tracks on which dogs, or similar animals are induced to run along a track by means of a lure propelled in front of the same.

Among the objects of the invention are improved means and methods for stopping or catching the dogs after a race is over, and other features which will appear more clearly from the following description of an exemplification of the invention, reference being had to the accompanying drawings in which Fig. 1 is a plan view of a racing track in connection with which my invention is practiced; and Fig. 2 is an elevational view of a mechanism for stopping the racing animals at the end of a race, a portion of the associated parts of the racing course being shown in section.

In order to train racing dogs, or similar animals, and improve their racing qualities, oval tracks, indicated at 10 in Fig. 1 of the drawing, are provided, the dogs being induced to race on said tracks by propelling in front of the same an artificial rabbit, or lure 11, as shown in Figs. 1 and 2. The lure 11 is held and driven by means of a lure arm 12 carried on a lure carriage 13 which is electrically propelled on a rail track 14 running parallel adjacent to the racing track 10. The dogs which are intended to participate in a race are held in a suitable starting box 15 adjacent to the track, and are simultaneously released at a moment when the lure is just passing in front of the box. After the dogs have thereupon raced over a predetermined distance on the track their relative positions are noted and the race is ended. The dogs, however, are still intent on getting the lure and it is accordingly important that they be stopped and prevented from further running.

As far as I am aware it has heretofore been customary to place across the racing track 10 a rigid barrier, or fence, of sufficient height to prevent the dogs from passing the same when pursuing the lure. It is, of course, important that the barrier shall not interfere with the movement of the lure and the lure arm when passing over the portion of the track where the barrier is intended to be placed for stopping the dogs. On the other hand, the time interval between the moment when the lure passes over a point on the racing track and the moment when the dogs in pursuit of the same pass over said place, is very short. Accordingly, much difficulty was experienced in quickly placing the barrier across the track, in the short interval available between the moments when the lure and the dogs, respectively, pass the point where the dogs are to be stopped. Very often it was found that at least some of the dogs failed to be caught by the barrier, and in other cases the quick shifting and pushing of the barrier across the track would be accompanied by hitting of the dogs and injury to the delicate and expensive animals.

According to my invention I avoid the foregoing difficulties leading to injuries to the dogs, by drawing a flexible curtain, of soft and pliable material, across the track instead of rigid barriers. The soft material has been found to effectively prevent injury to the dogs when hitting against the same at the moment when it is placed across the track.

Another specific feature of my invention resides in the provision of an automatic mechanism whereby the barrier or curtain for stopping the dogs, is automatically drawn across the racing track at a predetermined moment after the lure has passed the point where the dogs are to be stopped. The automatic barrier mechanism may be suitably actuated by a release which is set into action by the lure carriage in passing a predetermined point on the track. A mechanism of such character is shown by way of example in Fig. 2 of the drawing. At a point 21 of the track where the dogs are to be stopped, there is provided a folding curtain 22 which may be supported at its upper end by means of rings 23 arranged to slide on a curtain rod 25. The curtain rod 25 is suitably held above the racing track by means of a pair of posts 26 and 27, the first-mentioned post being disposed at the inner side of the rail track 14, while the second-mentioned post is disposed at the outer side of the racing track 10. The necessity for mounting the inner-curtain supporting-post 26 at the inner side of the rail track 14 arises by reason of the fact that the lure arm 12 must be free to move along the inner edge of the racing track 10, which movement would be obstructed in case the inner-supporting post 26 were mounted at the inner edge of the said racing track.

In the preferred embodiment of the invention the inner-curtain supporting post 26 constitutes at its lower end a part of the inner side wall 31 of the rail track housing 32 which is provided along the rail track to enclose the same, and the carriage that is moving thereon, to withdraw it from the view of the dogs and the public.

The structural features of the rail track housing are described and claimed in my Patent No. 1,680,072, granted August 7, 1928, on an application filed simultaneously herewith.

One end of the curtain, in the present case the outer end 35, is suitably secured to the outer curtain post 27 and the inner end is suitably stiffened, as by means of a suitable rod 36. Under normal conditions the curtain is held folded near the outer post 27 clearing substantially the full width of the track to permit passage of the lure and the dogs. However, if the dogs are to be stopped the stiffened inner end 36 of the curtain 22 is quickly pulled across the track at the moment after the lure has passed at that point, as by means of a pulling cable, or rope 38, and brought to the position indicated in the drawing. The dogs will thus be prevented from running further behind the lure, and the dog attendants which may stand near the curtain at the side of the track will catch the same and lead them back to their stalls. Since the material of the curtain is flexible, the dogs are never injured, and the simple manner of placing the barrier across the racing track enables doing so within a very short time interval.

As pointed out above, my improved barrier may be arranged to be actuated automatically in response to the passage of the lure across a pre-determined point on the racing track. In the form of the invention shown in the drawing, I provide to this end guide rollers 41 suitably supported on the inner curtain post 26, the curtain rope, or cable, 38 being guided on the rollers and having at its end a pulling weight 42 tending to hold the curtain 22 in the stop position, across said track, as shown in the drawing. In order to make it possible for the curtain to be held in the folded position, I provide means for retaining the pulling weight 42 at a point near the top of the curtain-supporting post 26. This gives to the pulling rope 38 sufficient leave-way to permit the inner curtain end 36 to be pulled to the outer supporting post 27. As a means for retaining the weight 42 in the upper position 42′, I provide a pivotally mounted bracket 45 that may be held in horizontal position 45′ by means of a latch 46. When the bracket is in the horizontal position it will support the pulling weight 42 near the top of the post and prevent it from falling. When the latch 46 is lifted the bracket arm 45 will drop down releasing the weight 42, which in turn pulls the curtain across the track to stop the dogs.

The automatic actuation of the latch to release the pulling weight at the moment when the curtain is to be drawn across the track may be effected in a variety of ways. In the form of the invention shown in the drawing the latch is arranged to be actuated electrically by means of a latch-pulling magnet 47 which is energized by means of energizing conductors 48 having included therein an electric current supply source 49. The energizing conductors 48 terminate in a contact switch 51 arranged within the rail track housing 14 so as to be normally open permitting the latch 46 to lock the bracket 45 in horizontal position. However, at the moment when the lure carriage with the lure passes at the point where the curtain 22 is to be drawn, a suitable arm 52 on the carriage 13 causes the switch 51 to be closed, thereby energizing the magnet 47. As a consequence, the latch 46 is lifted, unlocking the bracket 45 and releasing the weight 42 for pulling the curtain to the closed position. By suitably locating the point where the tripping switch 51 is located the time moment when the curtain is drawn across the track may be very closely controlled. As a result it is possible to insure the stopping of the dogs without relying on the skill of operators to pull the curtain in the short time interval available for this purpose.

I claim as my invention:

1. In an animal racing course comprising a racing track, an artificial lure, and means for driving said lure on said track to induce dogs to run therebehind, means for stopping said dogs at a pre-determined point of said track, said means comprising a barrier arranged to be held in a position across said track to obstruct movement of the dogs or in a position away from said track to permit free passage of the dogs, and means responsive to the passage of the lure across a predetermined point of the track spaced from said barrier to place said barrier in the first-mentioned position.

2. In an animal racing course comprising a racing track, an artificial lure, and means for driving said lure on said track to induce dogs to run therebehind, a barrier movable between a position across said track obstructing the passage of the dogs and a position permitting unobstructed passage of said dogs, a motor mechanism for moving said barrier between said positions, and means responsive to the passage of the lure across a pre-determined point on said track for controlling the operation of said motor.

3. In an animal racing course comprising a racing track, an artificial lure, and means for driving said lure on said track to induce dogs to run therebehind, a barrier movable between a position across said track obstructing the passage of the dogs and a position permitting unobstructed passage of said dogs, a motor mechanism for moving said barrier between said positions, an electric circuit for controlling the operation of said motor mechanism, and an electric control switch for said circuit arranged to be actuated by the passage of the lure over a predetermined point of said track.

4. In an animal racing course comprising a racing track, an artificial lure, means for driving said lure on said track to induce dogs to run therebehind, a barrier movable between a position across said track obstructing the passage of said dogs and a position permitting unobstructed passage of said dogs, latching means for holding said barrier in the unobstructed position, means tending to move said barrier to the obstructed position, a magnet for tripping said latch, an operating circuit for said magnet, and a control switch for said circuit arranged to be actuated by the passage of the lure at a predetermined point on said track.

5. In an animal racing course, a racing track on which dogs are induced to run behind a traveling lure, and means for stopping the dogs at a predetermined point along said track comprising two rigid upright members at opposite sides of the track, a curtain support which is connected to said members and extends across the track at such height as not to interfere with the passage of the dogs beneath the same, and a flexible barrier curtain slidably suspended from said support and extending downwardly from the same into close proximity to the surface of the racing track, said curtain being gathered laterally adjacent one of said upright members whereby not to interfere with the passage of the dogs and being slidable laterally along said support into an outspread position across the track.

6. In an animal racing course comprising a racing track on which dogs are induced to run behind a lure in front of the same, a rail track disposed along one side of said racing track, a carriage driven on said rail track, a lure supported by the carriage above said racing track, and means for stopping said dogs at a predetermined point on said track after the lure has passed the same, comprising a curtain support disposed above said track at a sufficient height to permit unobstructed passage of said lure and the dogs, and a flexible curtain slidably mounted on said support in a gathered condition at that side of the racing track which is opposite the rail track, said curtain being slidable laterally along said support toward the rail track into an outspread position across the track whereby to form a barrier for the dogs after the carriage supporting the lure has passed along the rail track beyond the location of the curtain support.

In witness whereof I have hereunto subscribed my name.

HARRY B. STAVER.